July 28, 1959 — C. T. STEIN — 2,896,522

PHOTO-IDENTIFICATION CAMERA

Filed Nov. 18, 1953 — 2 Sheets-Sheet 1

INVENTOR
CABOT T. STEIN
BY Edward L. Benno
ATTORNEY

INVENTOR
CABOT T. STEIN
BY Edward L. Benno
ATTORNEY

United States Patent Office 2,896,522
Patented July 28, 1959

2,896,522
PHOTO-IDENTIFICATION CAMERA
Cabot T. Stein, Chicago, Ill.

Application November 18, 1953, Serial No. 392,921

7 Claims. (Cl. 95—1.1)

This invention relates to photographic cameras and more specifically to an improved camera for photo-identification purposes.

As is well known in the art, photo-identification cameras find extensive use in educational institutions, and industrial and governmental organizations for the production of identification cards or passes. These identification cards usually contain a photograph of the person and a number of relevant statistics concerning the person. The signature of the person may also be placed on the card, as may be the name of the organization issuing the card.

One of the prime requirements for a camera for photo-identification purposes is that the camera must be capable of rapid automatic continuous operation. Another requirement is that the camera be reliable so that any danger of producing an identification card having the correct statistics but the incorrect person photograph, or vice versa, is at a minimum. Further, the camera should be simple in construction and operation so that it may be efficiently operated by an unskilled person. Therefore, it is the object of this invention to provide a camera for photo-identification purposes which will fulfill all of the above noted requirements.

It is a feature of the present invention that the card containing the statistics concerning the person, and the person, are simultaneously photographed on one frame of a standard film. This permits ease of handling of the film negative and simplifies the processing of the film negative to a finished identification card. Further, since the statistics, and possibly a signature, are reproduced by a photographic process, a forgery of the signature or an alteration of the statistics is very difficult.

It is another feature of the invention that the images of the person and the statistics are both projected onto the same side of the film. Therefore, any problems encountered in projecting an image on the back side of the film are avoided.

It is a further feature of the invention that novel automatic operating means are provided which prevents a double exposure of any one frame of film.

These and other objects and features of the present invention will be apparent upon a perusal of the following specification and drawings of which:

The present embodiment is the preferred embodiment, but it is to be understood that changes can be made in the present embodiment by one skilled in the art without departing from the spirit and scope of this invention.

Figure 3:
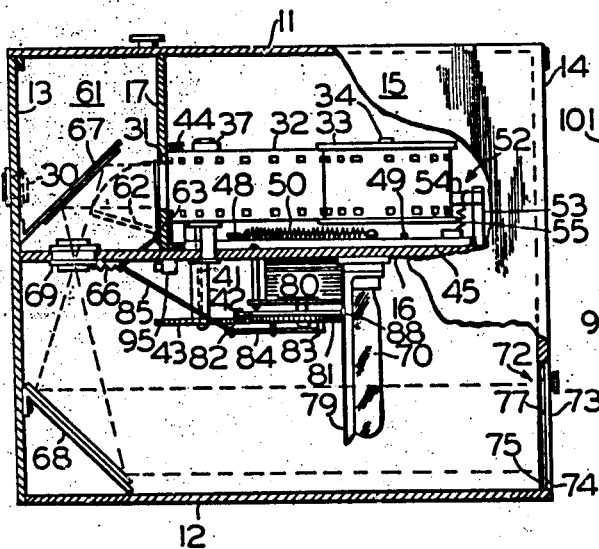
Fig. 3 is a side view of the camera with portions of one side wall removed and with a number of elements omitted to show the other elements more clearly.
Figure 4:
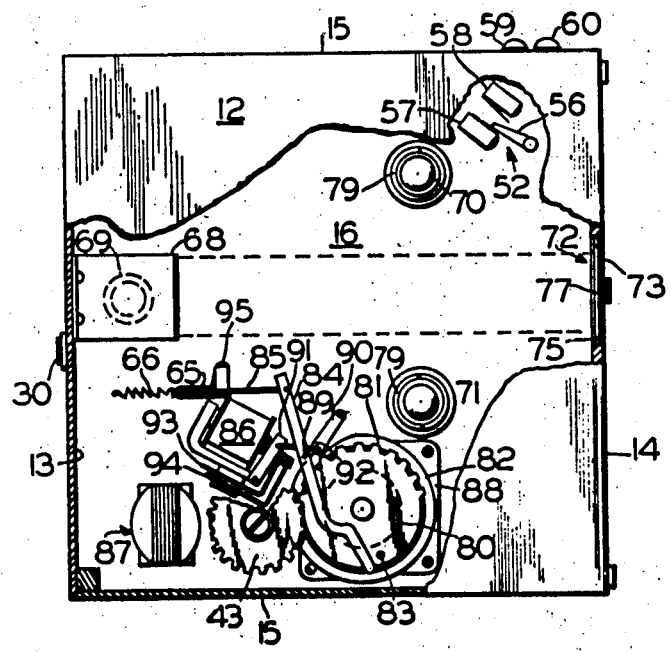
Fig. 4 is a bottom view of the camera with portions of the bottom wall removed.

For a detailed description of the invention, reference is made to the drawings. The camera 10 comprises a substantially rectangular case having a hingedly mounted top wall 11, a bottom wall 12, a front wall 13, a rear wall 14, and two side walls 15. The case 15 divided internally by a horizontally disposed panel 16 into an upper compartment and a lower compartment. Substantially all of the operating mechanism for the camera is mounted to the underside of the panel 16 within the lower compartment as can be seen in Figs. 3 and 4. A vertically disposed panel 17 is mounted to divide the upper compartment into a forward lens chamber and rearward film magazine. The various walls and panels of the camera are formed so as to be free of any leakage of light therethrough.

Figure 1:
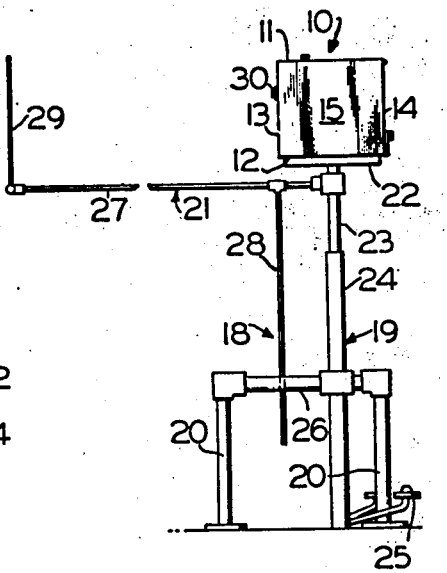
Fig. 1 is a side plan view of the camera and the camera mounting assembly.

For operation thereof, the camera 10 is mounted upon a stand 18. The stand 18 comprises a hydraulic jack 19, supports 20, a subject framing assembly 21, and a mounting table 22. The hydraulic jack 19 comprises a piston 23, a cylinder 24, and a pair of foot pedals 25. As is well known in the art, operation of one of the foot pedals causes oil to be delivered against the piston 23 through the cylinder 24 to cause the piston 23 to move upwardly. Operation of the other foot pedal 25 permits the piston to move downwardly under the force of gravity. The supports 20 are disposed about the hydraulic jack 19 and through a horizontal member 26 to maintain the jack 19 in an upright position, as can be seen in Fig. 1. The table 22 is mounted to the piston 23, and the camera 10 is in turn mounted upon the table 22. Thus operation of the foot pedals 25 will enable one to selectively position the camera 10 in any of a plurality of vertical positions. The subject framing assembly 21 comprises a horizontal guide bar 27, a vertical guide bar 28, and a frame 29. The horizontal guide bar 27 is fixedly mounted at one end thereof about the piston 23 to thereby be raised and lowered with the table 22. The vertical guide bar 28 is fixedly mounted about the horizontal guide bar 27 and is slidably mounted through a hole in the member 26. The frame 29 is mounted to the other end of the horizontal guide bar 27 so that when a person stands against the frame 29, the lens 30 is focusable upon their face.

Figure 2:
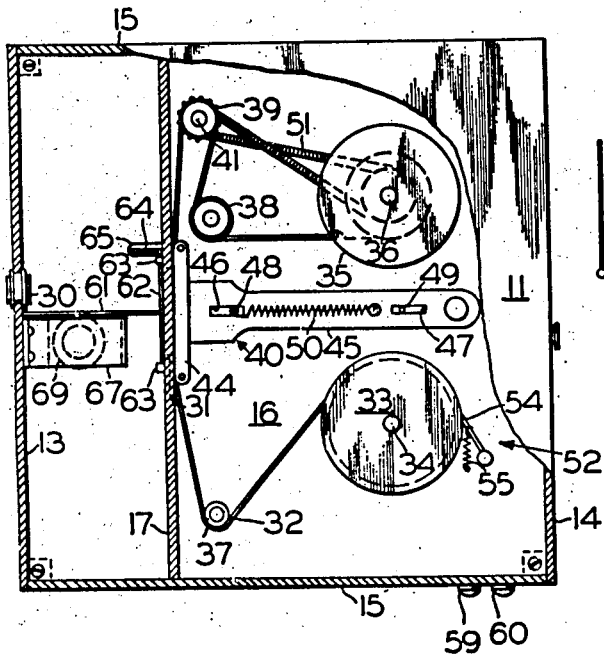
Fig. 2 is a top view of the camera with portions of the cover removed.

The focusable lens 30, which is used to project the image of the person to be photographed upon the film 32, is mounted through the front wall 13 of the camera. The film 32 passes by an opening or focal plane 31 provided through the panel 17 as the camera is operated. The panel 17 is the forward wall of the film magazine. A film supply spool 33 is rotatively mounted within the film magazine about the pin 34. A film take-up spool 35 is removably mounted to the pin 36 which is rotatively mounted within the film magazine. The film magazine is further provided with two idler rollers 37 and 38, a film sprocket 39, and a pressure plate assembly 40. The idler rollers 37 and 38 are mounted to be freely rotatable about suitable pins. The film sprocket 39 is rotatively mounted to the panel 16, and comprises a shaft 41 which is fixedly connected thereto and which extends downwardly through the panel 16 and through a collar 42 mounted to the underside of the panel 16 within the lower compartment, as can be seen in Figs. 2 and 3. A pair of pulleys are fixedly mounted to the shaft 41 of the sprocket 39 and the pin 36 of the take-up spool 35, and a coiled spring 51 is mounted about these pulleys so that the spool 35 is rotated as the sprocket 39 is rotated, as can easily be seen in Fig. 2. A gear 43 is mounted to the lower end of the shaft 41 so that as the gear 43 is rotated, the film sprocket 39 is caused to rotate. The pressure plate assembly 40 comprises an upright plate 44 and a member 45 fastened thereto at the lower edge thereof. The pressure plate assembly 40 is positioned with the plate 44 in an abutting relationship to the panel 17 over the opening 31. Two longitudinal slots 46 and 47 are formed through the member 45, and positioned to cooperate with two pins 48 and 49 respectively, so that the member 48 and the plate 44 are slidable a short distance toward and away from the opening 31. A coiled spring 50 is connected at one end thereof to the member 45 and at the other end thereof to the pin 48. The coiled spring 50 is tensioned so that the plate 44 is biased against the panel 17. The film 32, which is wound about the film supply spool 33, is extended about the idler roller 37, between the plate 44 and the panel 17 over the opening 31, about and in engagement with the sprocket teeth of the sprocket 39, about the idler roller 38, and wound onto the film take-up spool 35, as can be seen in Fig. 2. It thus can be seen that as the sprocket 39 is rotated the film 32 will be caused to pass from the film supply spool 33, by the opening 31, and onto the film take-up spool 35.

A mechanism 52 is provided to indicate to the operator of the camera the amount of film on the film supply spool 33. The mechanism 52 comprises a shaft rotatively mounted in a bearing member 53 which is fixedly mounted through the panel 16. An arm 54 is rigidly mounted to the upper end of the shaft, and a coiled spring 55 connected to the arm 54 and the panel 16 so as to bias the arm 54 and the shaft in a counterclockwise direction as viewed in Fig. 2. A second arm 56 is rigidly mounted to the lower end of the shaft and is positioned between two micro-switches 57 and 58. The micro-switches 57 and 58 are mounted to the underside of the panel 16 and are so positioned in relation to the arm 56 that micro-switch 57 is closed when the film supply spool 33 is fully loaded, and micro-switch 58 is closed when the film supply spool 33 is relatively empty. In the present embodiment the micro-switches 57 and 58 are connected to the two lamps 59 and 60. For purposes of clarity the wiring of the switches 57 and 58, the lamps 59 and 60, and the various other electrical elements of the camera, are not shown in any of the figures other than Fig. 6 wherein the wiring is shown diagrammatically. The micro-switches may be connected to indicating means other than the two lamps 59 and 60; for example, a buzzer, or a buzzer and one lamp, may be used to indicate the condition of the film supply spool 33.

Figure 5:
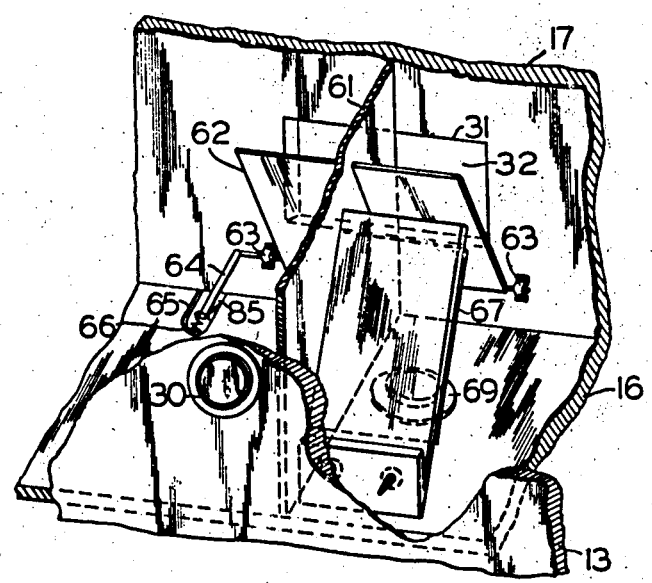
Fig. 5 is an isometric view of a portion of the optical structure of the camera.

The focal plane or opening 31 is of a size equal to the size of one frame of the film 32. The opening 31 is divided into two portions by the wall 61. The wall 61 is so positioned in relation to the lens 30 that the image of the person to be photographed is projected through the opening 31 on one side of the wall 61 when the shutter 62 is open, as can be seen in Figs. 2 and 5. The image of the statistics to be photographed is projected upon the film 32 through the other portion of the opening 31 on the other side of the wall 61. The shutter 62 is split into two sections and each of the sections is positioned on one side of the wall 61 over one of the portions of the opening 31. The shutter 62 is pivotally mounted to the panel 17 by means of mounting means 63. A lever arm 64 is rigidly mounted to the shutter 62, and extends diagonally downward through an opening 65 provided in the panel 16. A coiled spring 66 is connected to the lower end of the lever arm 64 and to the underside of the panel 16 to bias the shutter 62 to the closed position.

The optical elements concerned with the projection of the image of the statistics comprises two mirrors 67 and 68, a focusable lens 69, a pair of lamps 70 and 71, and a frame 72. The lens 69 is mounted through the panel 16 on the side of the wall 61 opposite from the lens 30 as can easily be seen in Fig. 5. The mirror 67 is mounted to the front wall 13 in the upper compartment by any suitable means, and is positioned with the plane surface of the mirror 67 at an angle of 45 degrees to the panel 16, immediately over the lens 69, and also at an angle of 45 degrees to the surface of the film 32 positioned against the opening 31. Thus it can be seen that light rays travelling from the lens 69 are projected onto the film 32 on the other portion of the same frame of film upon which the image of the person is projected. If desired, the wall 61 may be made movable in a plane at a right angle to the film so that adjacent edge portions of the light from the images of the person and the statistics will overlap to register upon the film as a line of variable width. However, it should be noted that the density of the line will vary with the amount of light at the adjacent edge portions of the projected images. The mirror 68 is mounted to the front wall 13 in the lower compartment by any suitable means, and is positioned immediately below the lens 69 at an angle of 45 degrees thereto, as can be seen in Figs. 3 and 4. The frame 72 comprises a rectangular plate 73 pivotally mounted at the lower edge thereof to the bottom wall 12 by means of mounting means 74, and a rectangular mask 75 fixedly mounted within an opening provided through the rear wall 14. The mounting means 74 is formed to provide a spring which biases the plate 73 to the upright position. A card 77 is provided for the statistics concerning the person to be photographed. The card 77 is positioned between the mask 75 and the plate 73. The frame 72 is positioned to be aligned with the mirror 68, and further so that the surface of the mirror 68 is at an angle of 45 degrees to the surface of the card 77. When a card 77 is to be inserted into the camera, the plate 73 is pivoted downward, the card 77 is placed against the mask 74 which may include positioning tabs, and the plate 73 is returned to the upright position. The two lamps 70 and 71, which are provided as a light source for illuminating the card 77, are mounted in suitable lamp bases which are in turn mounted to the underside of the panel 16. The lamps 70 and 71 are each provided with a reflector-shield 79 for preventing any direct emission of light from the lamps to the mirror 68, and for directing the light from the lamps to the card 77. The lens 69 is selected to have a focal length such that when properly focused, the image of the illuminated card 77 will fall onto the mirror 68, will be directed upward through the lens 69, will fall onto the mirror 67, and will be directed onto the film 32 through the opening 31 when the shutter 62 is open.

Turning next to a detailed description of the operating mechanism of the camera, reference is made to the drawings. The operating mechanism comprises an electric motor 80 which includes a power shaft driven by the armature thereof or by suitable speed reduction gearing mounted between the armature and the power shaft, a gear 81, a cam 82, a pin 83, a lever 84, a link 85, the gear 43, a relay 86, and a transformer 87. For purposes of clarity the relay 86 and the transformer 87 are not shown in Fig. 3. Also as noted previously, the various electrical connections are only shown diagrammatically in Fig. 6. The motor 80 is mounted by means of a bracket 88 to the underside of the panel 16, and is formed to operate to rotate the power shaft in a clockwise direction as viewed in Fig. 4. The cam 82 and the gear 81 are rigidly mounted on the power shaft of the motor 80. Although in the present embodiment the cam 82 and the gear 81 are shown as mounted to depend from the motor 80, the motor 80 can be so positioned as to permit mounting of the cam 82 and the gear 81 between the motor 80 and the panel 16. Approximately one half of the gear 81 is formed to be void of any gear teeth. The portion of the gear 81 which is void of gear teeth has a radius substantially equal to the radius of the pitch circle of the gear teeth. A couple of teeth of the gear 43 are formed of a reduced depth on the opposite ends of a diameter. The reduced depth varies as the radius of curvature of the portion of gear 81 which is void of gear teeth and cooperates with that portion so that gear 43 can rotate only when the gear teeth of gear 81 mesh with the gear teeth of gear 43. Gear 81 is formed to have sufficient teeth to cause one half of a revolution of gear 43 for each complete revolution of gear 81. As described above, the gear 43 is coupled to the sprocket 39 by means of the shaft 41, therefore rotation of the gear 43 causes a rotation of the sprocket 39. As the gear 81 rotates in a clockwise direction as viewed in Fig. 4, the gear 43 is caused to rotate one half of a revolution in the counterclockwise direction as viewed in Fig. 4, and the sprocket 39 is rotated in a clockwise direction as viewed in Fig. 2. The movement of the sprocket is sufficient to position the next frame of film 32 in the focal plane or opening 31. The pin 83 is mounted to depend from the lower surface of the gear 81 and is positioned near the periphery thereof and substantially on the side opposite from the segment containing the gear teeth. The lever 84 is pivotally mounted between the ends thereof on a bearing 89 which is mounted to depend from the underside of the panel 16. The link 85 is pivotally connected between one end of the lever 84 and the lower end of the lever arm 64. As noted previously, the coiled spring 66 is also connected to the lower end of the lever arm 64. Thus it can be seen that the lever 84 is biased in a counterclockwise direction as viewed in Fig. 4 by the coiled spring 66. The other end of the lever 84 is positioned to cooperate with the pin 83. When the motor 80 is operated, the pin 83 moves in a clockwise direction as viewed in Fig. 4 against the lever 84. The lever 84 is then pivoted about the bearing 89 in a clockwise direction as viewed in Fig. 4, causing the shutter 62 to be opened through the movement of the link 85 and the lever arm 64 against the bias of coiled spring 66. As the pin 83 moves further in the clockwise direction, it moves away from the lever 84 to thereby allow the lever 84 to return to normal under the bias of spring 66 and to thereby close the shutter 62. Since the pin 83 is on the opposite side of the gear 81 from the segment having the gear teeth, it can be seen that as the motor 80 operates from the position shown in Fig. 4, the shutter 62 will be operated first, and secondly, the sprocket 39 will be operated. The position shown in Fig. 4 is maintained by the cooperation between a depressed portion of the cam 82 and the pawl 90. The pawl 90 is pivotally mounted by means of a bearing to the underside of the panel 16. The pawl 90 normally engages the cam 82, as seen in Fig. 4, to index the gear 81. The pawl 90 is interconnected with the armature 91 of the relay 86 by a short link 92. The relay 86 may be any type well known in the art. Two spring contacts 93 and 94 are mounted to the heel piece of relay 86 and are open when relay 86 is deenergized. Spring contact 94 biases the armature 91 to the open position to thereby bias the pawl 90 toward the cam 82 through the link 92. The transformer 87, which may be of any suitable type of step-down transformer well known in the art, is mounted to the underside of panel 16.

A micro-switch 95 is also provided for controlling the operation of a flash unit (not shown) for illuminating the person to be photographed. The micro-switch is mounted to the underside of panel 16 adjacent to the opening 65. When the shutter 62 is operated to the open position, the lever arm 64 will engage the micro-switch 95 to cause the contacts thereof to close. The contacts of the micro-switch do not form a part of the camera electrical circuits shown in Fig. 6, but are connected to a flash unit (not shown) independent of the camera.

Figure 6:
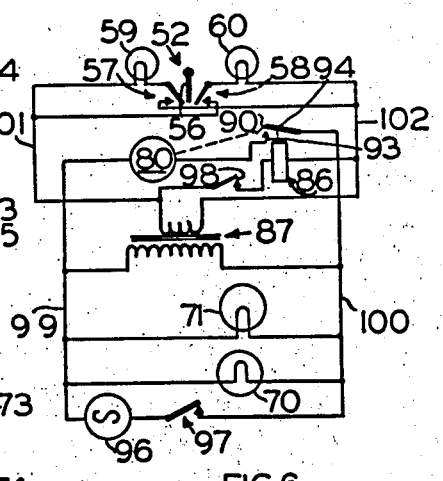
Fig. 6 is a diagrammatic view of the electrical circuits for automatic operation of the camera.

For a detailed description of the electrical circuits reference is particularly made to Fig. 6. An alternating current power source 96 is provided in series with a manually operable switch 97. The power source 96 and the switch 97 are connected to the conductors 99 and 100 so that when switch 97 is closed the power source voltage is impressed across these conductors. Lamps 70 and 71 for illuminating the card 75 are connected across conductors 99 and 100 so that these lamps are illuminated responsive to the closing of switch 97. The primary of transformer 87 is also connected across conductors 99 and 100. Motor 80 is connected in series with spring contacts 93 and 94 of relay 86 across conductors 99 and 100. Conductors 101 and 102 are connected across the secondary of the transformer 87. The winding of relay 86 is connected in series with a push button switch 98 across the conductors 101 and 102. Lamp 60 is connected in series with switch 58 across conductors 101 and 102, and lamp 59 is connected in series with switch 57 across conductors 101 and 102.

Turning next to a detailed description of the operation of the present embodiment, reference is again made to the drawings. Initially the camera is loaded with film as shown in Fig. 2, and switch 97 is closed. This causes an illumination of lamps 70 and 71 and an energization of the primary of transformer 87. Since the camera is loaded with film, the arm 54 will be in its maximum clockwise position as shown in Fig. 2, and arm 56 will be in its maximum counterclockwise position as viewed in Fig. 4. Switch 57 will then be closed, and a circuit including the secondary of transformer 87, conductors 101 and 102, and switch 57, will be completed for the illumination of lamp 59 to thereby indicate to the operator that the camera is fully loaded with film. The plate 73 is then opened and the card 77 containing the statistics of the person to be photographed is placed against the mask 75 as previously described, and the plate 73 is again closed. The person to be photographed is then positioned against the frame 29. The push button switch 98 is then momentarily closed. This completes the circuit for the energization of relay 86, which then operates to close its contacts 93 and 94. The closing of these contacts completes the circuit for the operation of motor 80, and withdraws the pawl 90 from engagement with the depressed portion of the cam 82. As the motor 80 begins to operate, the pawl 90 rides upon the cam 82 to maintain the contacts 93 and 94 closed, thereby maintaining the operating circuit for the motor 80. As the motor 80 further operates, the pin 83 engages the lever 84, causing the operation of the shutter 62. The image of the card 77 is focused upon the film 32 as previously described, and when the micro-switch 95 is closed, the flash unit (not shown) is operated, and the image of the person is focused upon the film 32 as previously described. As the motor 80 operates further, the shutter 62 is closed, and the gear 81 engages the gear 43 to cause a rotation thereof, and an advancement of the film 32 to bring the next frame in the focal plane 31. The pawl 90 will then drop into the depressed portion of cam 82, breaking the operating circuit for the motor 80, and indexing the motor 80 for the next operation. The card 77 is then removed from the frame 72 and a new one for the next person to be photographed is substituted. The next person is then positioned before the frame 29, and the camera is reoperated as described above. After substantially all of the film 32 has been used, contacts 58 will be closed as previously described, and lamp 60 will be illuminated to indicate this condition.

Figure 7:
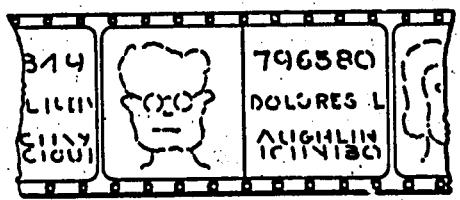
Fig. 7 is a view of a film strip as made by the camera.

After the film 32 has been removed from the camera, it may be developed by any means well known in the art to produce a negative substantially as shown in Fig. 7.

Having described the invention, what is considered new and desired to be protected by Letters Patent is:

1. A camera comprising a rectangularly shaped focal plane in which one frame of film is positionable, a wall mounted in said camera normal to said focal plane to divide said focal plane into two adjacent substantially identically shaped rectangular portions, a rectangularly shaped shutter being substantially split into two identical sections by a slot formed therein, said shutter pivotally mounted in said camera and through said wall with said slot cooperating with said wall so that said shutter is pivotable to simultaneously expose and to simultaneously cover said portions, a focusable lens for photographing a person, said lens mounted in said camera on one side of said wall so that said lens is focusable upon one of said portions of said focal plane when said shutter is pivoted to expose said portions, a second focusable lens for photographing a card, said second lens mounted within said camera on the other side of said wall, a frame for holding a card to be photographed, said frame mounted within said camera at the side thereof opposite from that in which said first lens is mounted, means providing access to said frame through the side of said camera at which said frame is mounted, and a pair of mirrors positioned one on each side of said second lens for directing the image of a card mounted in said frame through said second lens and onto the other portion of said focal plane on the other side of said wall in proper image relation to any image of a person directed by said first lens upon said one of said portions when said shutter is pivoted to expose said portions and means connected to said shutter for momentarily pivoting said shutter to simultaneously momentarily expose and cover said portions of said focal plane.

2. In a camera as claimed in claim 1, a lamp illuminating said frame, said lamp mounted within said camera and positioned to illuminate said frame when lit, and a lamp shield and reflector mounted within said camera in cooperation with the lamp to shield said pair of mirrors from any direct light rays from said lamp and to reflect light rays to said frame.

3. In a camera as claimed in claim 1, said frame comprising a rectangular plate and a rectangular mask, mounting means for pivotally mounting said plate to said camera on the bottom wall thereof and for biasing said plate to the upright position, and second mounting means for mounting said mask within an opening through one wall of said camera and in cooperation with said plate so that said card is positionable between said mask and said plate and maintainable therein.

4. A camera comprising a case, a focal plane in which a frame of film is positionable secured in said case parallel to the front wall thereof and spaced a certain distance therefrom, a dividing wall secured in said camera to extend between said front wall and said focal plane and positioned to divide said focal plane into two portions, a shutter, said shutter pivotally carried in said camera over each of said two portions of said focal plane on each side of said dividing wall, whereby said shutter is pivotable to simultaneously expose and to simultaneously cover said two portions of said focal plane, a first focusable lens for photographing a person, said first lens carried in said front wall on one side of said dividing wall so that said first lens is focusable upon one of said portions of said focal plane, a second dividing wall secured in said camera between said front wall and the rear wall of said case and below said focal plane and said first dividing wall, a second focusable lens for photographing a card, said second lens carried in said second dividing wall between said front wall and said focal plane on the other side of said first dividing wall, means for mounting a card in said rear wall below said second dividing wall, and mirror means secured in said camera on each side of said second dividing wall in cooperation with said second lens and said means for mounting a card to direct an image of said card through said second lens and onto the other portion of said focal plane.

5. A camera comprising a case, a focal plane in which a frame of film is positionable secured in said case parallel to the front wall thereof and spaced a certain distance therefrom, a first dividing wall secured in said camera to extend between said front wall and said focal plane and positioned to divide said focal plane into two portions, a shutter being substantially split into two sections by a slot formed therein, said shutter pivotally carried in said camera and through said first dividing wall with said slot cooperating with said dividing wall so that said shutter is pivotable to simultaneously expose and to simultaneously cover said two portions of said focal plane, a first focusable lens for photographing a person, said first lens carried in said front wall on one side of said dividing wall so that said first lens is focusable upon one of said portions of said focal plane, a second dividing wall secured in said camera between said front wall and the rear wall of said case and below said focal plane and said first dividing wall, a second focusable lens for photographing a card, said second lens carried in said second dividing wall between said front wall and said focal plane on the other side of said first dividing wall, means for mounting a card substantially in said rear wall below said second dividing wall, and mirror means secured in said camera on each side of said second dividing wall and positioned to direct an image of said card through said second lens and onto the other portion of said focal plane.

6. A camera comprising a case, a focal plane in which a frame of film is positionable secured in said case parallel to the front wall thereof and spaced a certain distance therefrom, a first dividing wall secured in said camera to extend between said front wall and said focal plane and positioned to divide said focal plane into two portions, a shutter, said shutter pivotally carried in said camera on each side of said first dividing wall and in cooperation with said focal plane whereby said shutter is pivotable to simultaneously expose and to simultaneously cover said two portions of said focal plane, a first focusable lens for photographing a person, said first lens carried in said front wall on one side of said first dividing wall so that said first lens is focusable upon one of said portions of said focal plane, a second dividing wall secured in said camera between said front wall and the rear wall of said case and below said focal plane and said dividing wall, a second focusable lens for photographing a card, said second lens carried in said second dividing wall between said front wall and said focal plane on the other side of said first dividing wall, frame means carried in the rear wall of said camera for mounting a card in said rear wall below said second dividing wall, a pair of mirrors, one of said mirrors carried above said second dividing wall and the other of said mirrors carried below said second dividing wall in said case, said pair of mirrors positioned relative to the other portion of said focal plane, said second lens and said frame means so that an image of said card is directed by said mirrors through said second lens and onto the other portion of said focal plane.

7. A camera comprising a case, a first dividing wall secured in said case parallel to the upper and lower walls thereof and extending between the front and rear walls thereof to substantially divide said case into an upper and a lower compartment, a second dividing wall secured in said case parallel to the front wall thereof and spaced a certain distance therefrom to divide said upper compartment into a forward compartment and a rearward compartment, said second dividing wall having a focal plane formed therein, film advancing and positioning means carried in said upper rearward compartment for positioning successive frames of film in said focal plane, a third dividing wall secured in said upper forward compartment and extending between said front wall and said second dividing wall and positioned to divide said focal plane into two portions, a shutter, said shutter pivotally carried in said upper forward compartment on each side of said third dividing wall in cooperation with said focal plane so that said shutter is pivotable to simultaneously expose and to simultaneously cover said two portions, a first focusable lens for photographing a person, said first lens carried in said front wall on one side of said third dividing wall so that said first lens is focusable upon one of said portions of said focal plane, a second focusable lens for photographing a card, said second lens carried in said first dividing wall between said lower compartment and said upper forward compartment, frame means for holding a card disposed in said lower compartment at said rear wall and being accessible from the rear of said camera, a pair of mirrors, one of said mirrors secured in said upper forward compartment on the other side of said third dividing wall, the other of said mirrors carried in said lower compartment, said pair of mirrors positioned relative to the other portion of said focal plane, said second lens and said frame means so that an image of said card is directed through said second lens and onto the other portion of said focal plane, and lamp means carried in said lower compartment for illuminating any card positioned in said frame.

References Cited in the file of this patent
UNITED STATES PATENTS

| | | |
|---|---|---|
| 756,614 | Folmer | Apr. 5, 1904 |
| 975,277 | Pond | Nov. 8, 1910 |
| 1,602,311 | Pieczko | Oct. 5, 1926 |
| 1,645,590 | Ernst | Oct. 18, 1927 |
| 2,125,388 | Monroe | Aug. 2, 1938 |
| 2,148,620 | Henderson | Feb. 28, 1939 |
| 2,210,610 | White | Aug. 6, 1940 |
| 2,339,657 | Smith | Jan. 18, 1944 |
| 2,391,044 | Terry | Dec. 18, 1945 |
| 2,420,046 | Loeb | May 6, 1947 |